United States Patent
Aninger et al.

(10) Patent No.: US 8,789,799 B2
(45) Date of Patent: Jul. 29, 2014

(54) CABLE HOLDER

(75) Inventors: Franz Aninger, Finningen (DE); Dieter Hotz, Dischingen (DE); Cengiz Kücük, Syrgenstein (DE); Christian Mesarosch, Augsburg (DE); Pedro Sancho, Saragossa (ES); Sebastian Wagner, Glött (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 570 days.

(21) Appl. No.: 12/384,152

(22) Filed: Mar. 31, 2009

(65) Prior Publication Data

US 2009/0242709 A1    Oct. 1, 2009

(30) Foreign Application Priority Data

Apr. 1, 2008   (DE) .................. 10 2008 016 631

(51) Int. Cl.
*F16L 3/22* (2006.01)

(52) U.S. Cl.
USPC ............. 248/68.1; 248/65; 248/67.7; 248/70; 248/73; 174/99 R; 174/60; 174/135; 174/138 G; 174/154; 174/100

(58) Field of Classification Search
USPC ............... 248/65, 67.7, 68.1, 70, 71, 73, 689, 248/690, 231.81, 316.7, 316.1; 134/201; 68/3 R; 174/99 R, 60, 135, 138 G, 154, 174/100
See application file for complete search history.

(56) References Cited

U.S. PATENT DOCUMENTS

| | | | | |
|---|---|---|---|---|
| 3,430,662 A | * | 3/1969 | Guarnaschelli | 138/120 |
| 3,554,474 A | * | 1/1971 | Davies | 248/49 |
| 4,433,821 A | * | 2/1984 | Bolding et al. | 248/65 |
| 4,840,023 A | * | 6/1989 | Borsani | 59/78.1 |
| 5,039,828 A | * | 8/1991 | Marks et al. | 174/135 |
| 5,332,866 A | * | 7/1994 | Sawamura | 174/101 |
| 5,401,905 A | * | 3/1995 | Lesser et al. | 174/99 R |
| 5,665,936 A | * | 9/1997 | Sawamura et al. | 174/32 |
| 5,746,389 A | * | 5/1998 | Willmann | 242/615.1 |
| 5,816,854 A | * | 10/1998 | Baggett et al. | 439/540.1 |
| 5,820,048 A | * | 10/1998 | Shereyk et al. | 248/68.1 |
| 5,848,865 A | * | 12/1998 | Beals | 410/99 |
| 5,878,548 A | * | 3/1999 | Sauer et al. | 53/410 |
| 5,962,814 A | * | 10/1999 | Skipworth et al. | 174/135 |
| 6,012,684 A | * | 1/2000 | Umney et al. | 248/65 |
| 6,049,040 A | * | 4/2000 | Biles et al. | 174/68.3 |
| 6,095,461 A | * | 8/2000 | Daoud | 248/65 |
| 6,234,429 B1 | * | 5/2001 | Yang | 248/74.1 |
| 6,268,566 B1 | * | 7/2001 | Takiguchi et al. | 174/72 A |
| 6,443,404 B1 | * | 9/2002 | Montagano et al. | 248/74.5 |
| 6,444,903 B2 | * | 9/2002 | Saeki et al. | 174/480 |
| 6,461,052 B1 | * | 10/2002 | Hines et al. | 385/53 |

(Continued)

FOREIGN PATENT DOCUMENTS

| | | |
|---|---|---|
| DE | 9309749 U1 | 8/1993 |
| DE | 102004055819 A1 | 5/2006 |
| DE | 102004056501 B4 | 2/2008 |

*Primary Examiner* — Terrell McKinnon
*Assistant Examiner* — Michael McDuffie
(74) *Attorney, Agent, or Firm* — James E. Howard; Andre Pallapies

(57) ABSTRACT

A cable holder for a cable includes a guide section for guiding the cable that can be pivoted in sections for a change in direction of a run of the cable.

9 Claims, 4 Drawing Sheets

(56) References Cited

U.S. PATENT DOCUMENTS

| | | | |
|---|---|---|---|
| 6,469,254 B1 * | 10/2002 | Lee et al. | 174/138 G |
| 6,570,093 B2 * | 5/2003 | Doshita et al. | 174/72 A |
| 6,677,526 B2 * | 1/2004 | Kishizawa | 174/68.1 |
| 6,830,225 B2 * | 12/2004 | Kato | 248/49 |
| 6,844,497 B2 * | 1/2005 | Frantz et al. | 174/72 A |
| 6,930,244 B1 * | 8/2005 | Nebel | 174/486 |
| 7,109,420 B2 * | 9/2006 | Arai et al. | 174/72 A |
| 7,137,173 B2 | 11/2006 | Sipple | |
| 7,318,621 B2 * | 1/2008 | Suzuki et al. | 296/208 |
| 7,345,241 B2 * | 3/2008 | Caveney et al. | 174/99 R |
| 7,619,164 B2 * | 11/2009 | Caveney et al. | 174/99 R |
| 7,658,351 B2 * | 2/2010 | Hansen | 248/74.3 |
| 7,745,738 B2 * | 6/2010 | Nakayama | 174/480 |
| 7,763,800 B2 * | 7/2010 | Lesniak et al. | 174/68.3 |
| 7,857,264 B2 * | 12/2010 | Carter | 248/65 |
| 2003/0173102 A1 | 9/2003 | Kishizawa | |

* cited by examiner

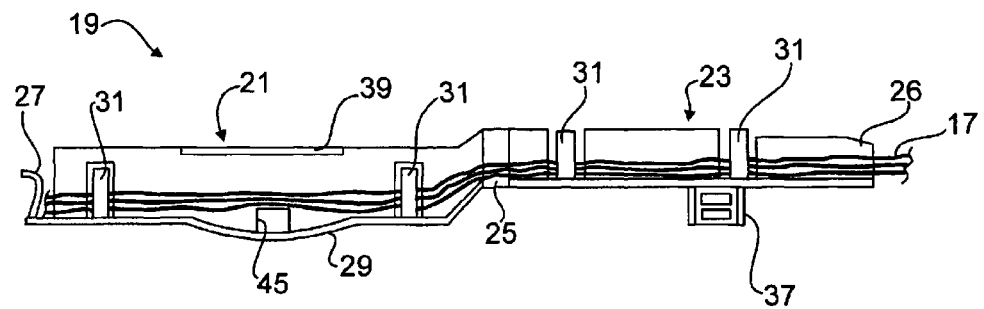
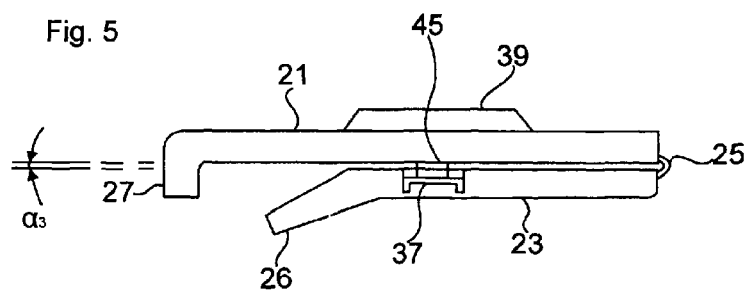

CABLE HOLDER

BACKGROUND OF THE INVENTION

Domestic appliances have a large number of electrical components which are supplied with current via power supply cables or controlled by means of control leads. For this purpose it may be necessary to run cables via one or more housing edges of the electrical component.

In order to simplify power supply cable installation, it is known to use cable holders having at least two guide sections which are angled to one another and matched to the external contour of the electrical component. The cable holder can be fitted with the relevant cables separately from the appliance and then installed in the appliance. By means of the mutually angled guide sections of the cable holder, cables can be easily run round edges of the electrical component's housing.

The cable holder with its two guide sections is usually a pre-profiled, rigid component which is installed with its angled guide sections abutting the electrical component.

Fitting such a cable holder with power supply cables remains a complex assembly operation because of the mutually angled guide sections. In addition, this kind of pre-profiled cable holder is altogether bulky and therefore can only be stored and packaged in a space-intensive manner.

BRIEF SUMMARY OF EXEMPLARY EMBODIMENTS OF THE INVENTION

An object of the invention is to provide a cable holder which simplifies cable installation, particularly in a domestic appliance.

The invention proceeds from a cable holder for a cable, in particular for electrical conductors or fiber-optic cables, having one or more guide sections for guiding the cable.

One or more guide sections of the cable holder are not rigid, but pivotally disposed on the cable holder. To enable the power supply cables to be fitted particularly simply during assembly, the one or preferably two guide sections of the cable holder can therefore be disposed aligned to one another in a common assembly plane in which the two guide sections enclose an angle of 180°. During fitting, the cables can therefore be guided round edges without complex assembly. Moreover, the cable holders can be compactly packaged to save storage space. In the packaging position, the two guide sections can lie side by side, for example, i.e. with an angle of zero between the two guide sections. The two guide sections of the cable holder can be placed in their mutually angled installation position only for final assembly.

To facilitate handling of the cable holder, its two guide sections are connected together via an articulated joint such as a hinge region, in particular a living (integral) hinge. In this case, the guide sections can be folded out into an installation position or a cable fitting position, depending on the assembly operation, or alternatively folded together in a packaging position.

In their installation position, the two guide sections of the cable holder can preferably be positioned so that they directly match the outline at the electrical component of the household appliance, it being advantageous in terms of assembly for the guide sections and the electrical component to be snap-fit together without the use of tools.

The two mutually adjustable guide sections of the cable holder can preferably be folded completely together in their packaging position so that the two guide sections lie side by side in the longitudinal direction. In this case, at least one of the above mentioned snap-lock elements can serve the dual function of providing a snap-lock connection with the electrical component and also securing the adjacent guide section and engaging it accordingly in a snap-locked manner.

In a particular embodiment, the cable holder can be adapted for use in a domestic appliance, in particular a water carrying domestic appliance such as a dishwasher or washing machine. A dishwasher usually has, on the inner metal plate of its door, a housing of a dispenser which constitutes an electrical component within the meaning of the invention. The dispenser is known to be provided with electrical actuating elements, such as a magnetic coil and an electrical low rinse aid indicator. The cable holder can be mounted in the installation position on the housing of the dispenser via the abovementioned snap-lock elements.

The door of the dishwasher can be implemented with, facing the dishwasher cavity, an inner metal plate on the outer side of which a door exterior, e.g. an enclosed fascia or a decor panel. For factory assembly of the appliance door, the frontally still open, trough-shaped inner metal plate is hinged to the dishwasher via lateral hinge levers. In order to facilitate hinging actuation of the inner metal plate hinged to the dishwasher at this stage of assembly, one of the guide sections of the cable holder can be implemented with a handle. The handle can be a gripping bar raised up from the guide section.

For safe actuation of the handle formed on the guide section, the snap-fits of the cable holder to the housing of the dispenser must be implemented in a sufficiently stable manner. It is therefore preferable if, in addition to the snap-fits on the dispenser housing, at least one guide section of the cable holder is additionally also coupled directly to the inner plate of the appliance door. Pulling forces exerted on the cable holder when the handle is actuated can therefore be reliably absorbed by the inner plate of the door.

It is preferable in production engineering terms if the guide sections are of the same material and/or of a piece with the hinging region and the snap-lock elements. In this case, the cable holder can be simply manufactured as an injection-molded part. Particularly with an angle of 180° between the two guide sections, the cable holder can be advantageously produced using simple forming dies without additional slider components.

The invention also relates to a domestic appliance having at least one cable holder according to the invention and a method for assembling such a domestic appliance.

BRIEF DESCRIPTION OF THE DRAWINGS

An exemplary embodiment of the invention will now be shown with reference to the accompanying drawings in which:

FIG. 4 shows the cable holder with power supply cables fitted; and

FIG. 5 shows the cable holder in a packaging position.

DETAILED DESCRIPTION OF EXEMPLARY EMBODIMENTS OF THE PRESENT INVENTION

Figure 1:
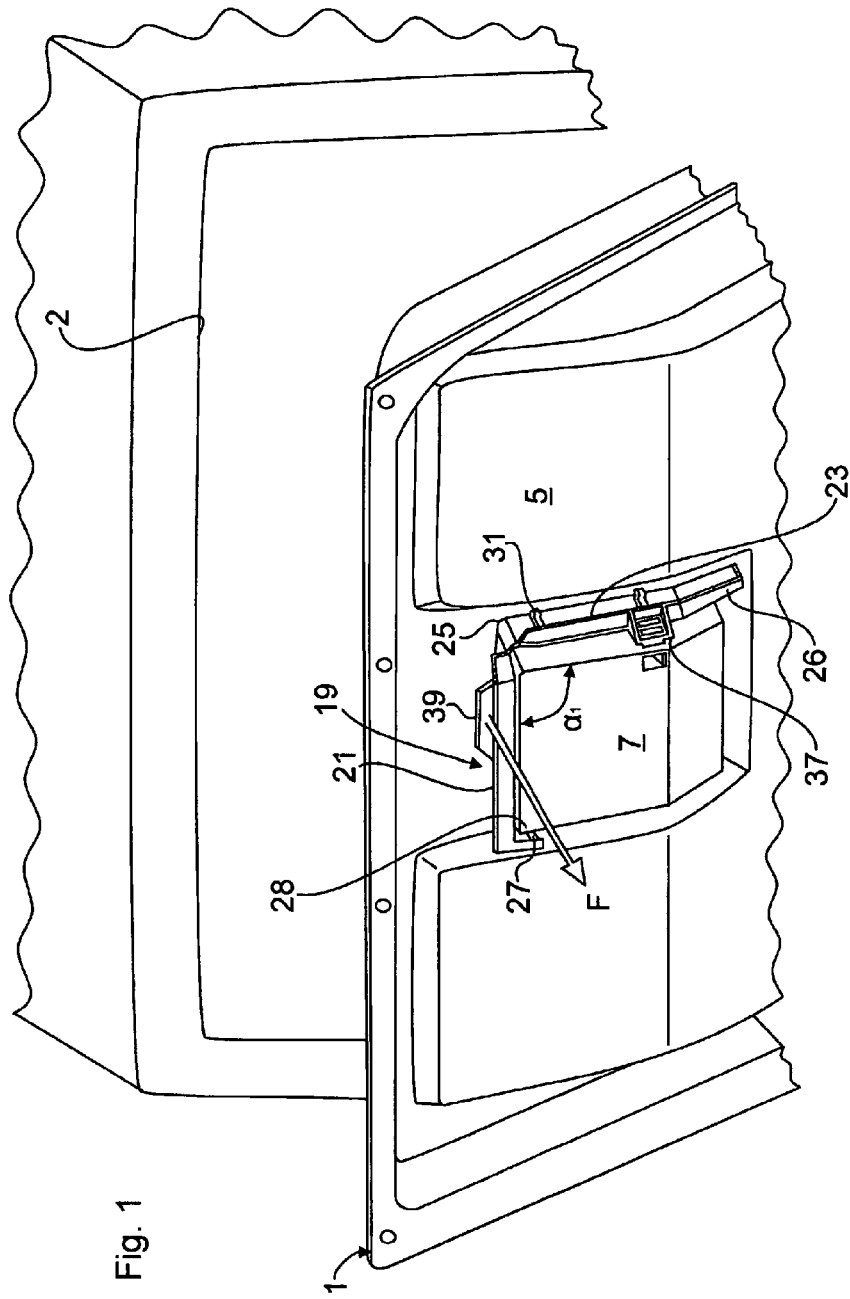
FIG. 1 is a schematic perspective view of a dishwasher, from the appliance door of which an external front element has been removed.

FIG. 1 shows a not yet completely assembled dishwasher having an appliance door 1 which opens or closes a front loading opening of a dishwasher cavity 2 of the dishwasher. The door is bottom-hinged to the dishwasher so as to pivot about a horizontal axis in a known manner. In the completely assembled state, the appliance door 1 has in the usual manner an inner metal plate 5 and an outer door element such as a fascia panel or decor panel mounted thereto. In FIG. 1, the outer door element has been omitted for reasons of clarity so that the inner metal plate 5 is revealed.

Figure 2:
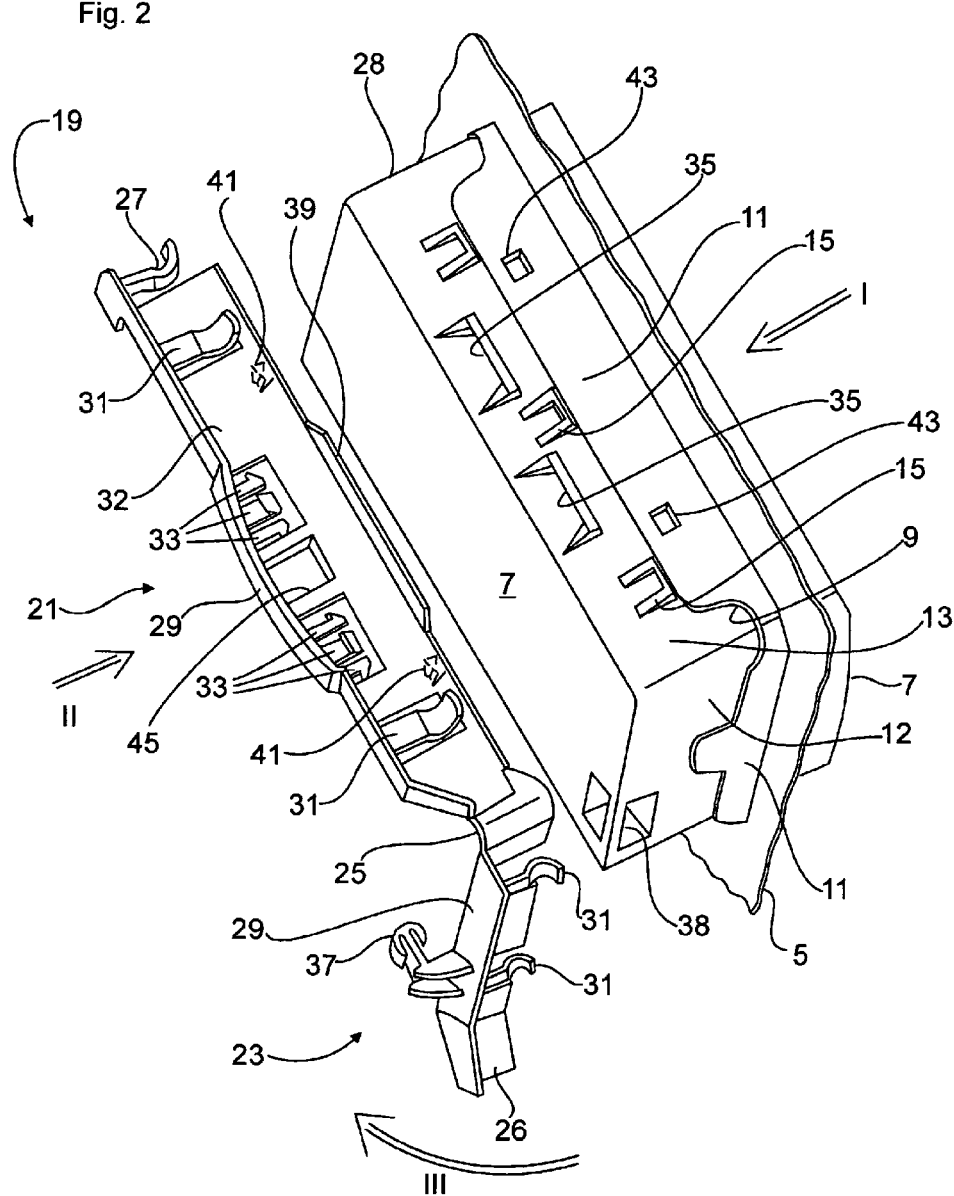
FIG. 2 is a perspective detail view of an assembly operation for mounting the cable holder on the housing of the dispenser of the dishwasher.

As can be seen from FIG. 1, a dispenser 7 for detergent dosing is incorporated in the appliance door 1. For mounting the dispenser 7, the inner metal plate 5 has an approximately central assembly opening 9 as shown in FIG. 2, from the edges of which mounting flanges 11 project on the side facing away from the dishwasher cavity 2. The dispenser 7 as shown in FIG. 1 is pushed into the assembly opening 9 in a assembly direction I until the snap-lock projections 15 provided on the edge faces 12, 13 of the dispenser 7 engage behind the mounting flanges 11, as shown in FIG. 2.

For detergent dosing during a washing cycle, the dispenser 7 is controlled by an electronic control device likewise incorporated in the appliance door 1. The control device is also in signaling connection with an electronic low rinse aid indicator incorporated in the dispenser 7. For problem-free, precisely defined cable routing between the control device and the dispenser 7, the power supply cables 17 are held in a cable guiding element 19 which is shown in its installation position in FIG. 1. The cable guiding element 19 has, as shown in FIG. 1, two guide sections 21, 23 set at an angle $\alpha_1$ of 90° to one another. These enclose vertical and horizontal edge faces 12, 13 of the dispenser 7 that are likewise at right angles to one another. By means of the cable holder 19, the cables are guided along the two edge faces 12, 13 as far as the level of the respective connection sockets (not shown) of the dispenser 7.

The cable holder 19 is here a one-piece plastic injection molded part made of uniform material. The two strip-shaped guide sections 21, 23 are pivoted together via a living hinge 25 and approximately half-enclose the dispenser 7, the vertically installed guide section 23 in FIG. 1 extending down beyond the lower housing edge of the dispenser 7. The cables 17 are therefore looped around the lower end 26 of the guide section 23 and return in the opposite direction to the corresponding connection socket of the dispenser 7. The thereby created cable loops enable any drops of liquid running along the cables 17 to drip off.

The, in the installation position, horizontally lying guide section 21 of the cable holder 19 grips around the opposite housing edge 28 with its angled free ends 27. At the free end 27 of the horizontal guide section 21 there is provided, as shown in FIG. 2, an elastically resilient clip which, in the installation position, presses against a vertical edge face of the dispenser.

For lateral shielding of the cables 17, the two guide sections 21, 23 of the cable holder 19 have front delimiting walls 29. On each of the guide sections 21, 23, fastening clips 31 are additionally provided which fix the cables 17 to the floor 32 of the guide sections 21, 23 of the cable holder 19.

The horizontal guide section 21 of the cable holder 19 also has, as shown in FIG. 2, elastically resilient snap-lock hooks 33. These are horizontally aligned contrary to the assembly direction I and formed below the floor 32 of the guide section 21 on the front delimiting wall 29.

For installing the cable holder 19 on the dispenser 7, the cable holder's horizontal guide section 21 is first pushed onto the upper edge face 13 of the dispenser 7 in the horizontal assembly direction II as shown in FIG. 2, the horizontally aligned snap-lock hooks 33 being guided by corresponding snap-lock openings 35 in the dispenser 7 until the snap-lock hooks 33 engage behind the corresponding snap-lock openings 35. When the horizontal guide section 21 has been snap-locked with the dispenser 7, the guide section 23 is pivoted counter-clockwise about the living hinge 25 into its vertical installation position in the assembly direction III. In the installation position, a snap-lock pin 37 provided on the vertical guide section 23 is snap-fit into a corresponding snap-lock receptacle 38 on the side of the dispenser 7.

For ease of handling of the appliance door 1 mounted to the dishwasher as shown in FIG. 1, a gripping bar 39 is formed on the floor 32 of the guide section 21. The gripping bar 39 extends approximately centrally along the guide section 21 on the side opposite the front delimiting wall 29. To pivotally actuate the inner metal plate 5 already hinged to the housing of the dishwasher, the gripping bar 39 is grasped from behind by the assembler and the actuating force F indicated in FIG. 1 is applied. The upper snap-lock connection provided between the snap-lock hooks 33 and the snap-lock openings 35 of the dispenser 7 must be dimensioned accordingly in order to keep the cable holder 19 stable on the dispenser 7 when the actuating force F is applied. To reinforce the upper snap-lock connection, additional snap-lock projections 41 can be provided on the floor 32 of the guide section 21, as indicated in FIG. 2. When the cable holder 19 is pushed onto the dispenser 7 in the assembly direction II, the snap-in projections 41 can provide additional locking in conjunction with corresponding snap-lock openings 43 in the mounting flange 11 of the inner metal plate 5. In this case the cable holder 19 is form-fit not only to the dispenser 7, but also to the inner metal plate 5.

Figure 3:
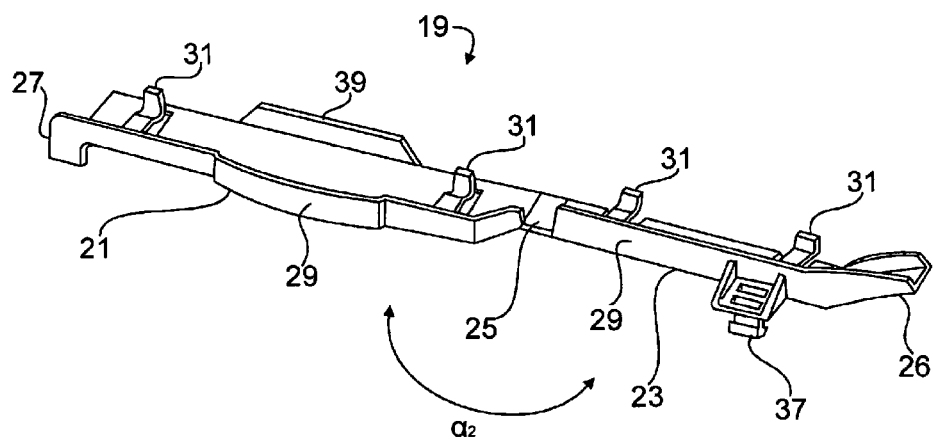
FIG. 3 shows the cable holder in isolation.

As already mentioned, the cable holder 19 is made by plastic injection molding. The cable holder 19 is produced in an injection molding chamber with folded-apart guide sections 21, 23 aligned lengthwise to one another, as shown in FIG. 3. The angle $\alpha_2$ between the two guide sections 21, 23 is 180° in the manufacturing position shown. Because of the folded-out position of the two guide sections 21, 23, simple injection molding dies can be used, without additional slider components being required.

Pre-assembly of the power supply cables 17 on the cable guiding element 19 as shown in FIG. 4 also takes place in the lengthwise aligned manufacturing position of the guide sections 21, 23 as shown in FIG. 3. For this purpose the cables 17 are clamped between the fastening clips 31 and the floor 32 of the guide sections 21, 23. Pre-assembly takes place in a common assembly plane, without the cables 17 having to be assembled round edges between mutually angled guide sections 21, 23 in a complex assembly procedure. The pre-assembly position of the cable holder 19 as shown in FIG. 4 is therefore identical to its manufacturing position shown in FIG. 3.

When pre-assembly is complete, the cable holder 19 with the cables 17 fitted can be moved via the living hinge 25 to a packaging position, as shown in FIG. 5. In the packaging position shown, the two guide sections 21, 23 are completely folded together. The cable holder 19 therefore assumes an extremely compact, closed geometry in which the angle $\alpha_3$ between the two guide sections 21, 23 is reduced to zero. Cable holders 19 folded together in this way can be packed or stored in a space-saving manner.

To make the packaging position secure, the snap-lock pin 37 of the guide section 23 that is vertical in the installation position engages in a corresponding snap-lock receptacle 45 provided in the floor 32 of the guide section 21 that is horizontal in the installation position. The snap-lock pin 37 therefore serves the dual function of laterally locking with the dispenser 7 in the installation position and locking with the guide section 21 in the packaging position.

The invention claimed is:

1. A cable holder for a cable, comprising:

a generally linearly extending continuous unitary body defining a continuous cable path thereacross, the body including a first guide section defining a first cable path segment; a first delimiting wall extending generally perpendicularly away from the first cable path segment leaving an opposing side open for cable insertion; a second guide section defining a second cable path segment; a second delimiting wall extending generally perpendicularly away from the second cable path segment leaving an opposing side open for cable insertion: a hinge separating the first guide section from the second guide section and defining a third cable path segment linking the first cable path segment with the second cable path segment wherein the first cable path segment and the second cable path segment are substantially coplanar and offset from one another thereby forming a curved portion in the continuous cable path wherein the hinge is configured as an articulated joint for changing the direction of the run of the cable for movement between a first position for general use wherein the first cable path segment and the second cable path segment extend in a first direction and a second position for packaging wherein the first cable path segment and the second cable path segment extend in a generally parallel relationship and the second cable path segment extends in a second direction opposite from the first direction and wherein the first delimiting wall and the second delimiting extend in a generally parallel relationship; and a plurality of fastening clips on the delimiting walls projecting outwardly therefrom across the first cable path segment and the second cable path segment to fix cables to each of the first cable path segment and the second cable path segment.

2. The cable holder of claim 1, wherein the guide section is configured for guiding a cable formed as an electrical conductor or a fiber-optic cable.

3. The cable holder of claim 1, wherein the hinge comprises a living hinge.

4. The cable holder of claim 1, wherein the guide section is detachably connected to a component of a domestic appliance with a snap-lock connection.

5. The cable holder of claim 1, wherein the body is detachably connected to an electrical component.

6. The cable holder of claim 1, wherein at least one of the guide sections, an articulated joint and a snap-lock element are of a same material and/or implemented in a single piece.

7. The cable holder of claim 1, wherein the cable holder includes an injection molded guide section.

8. The cable holder of claim 1, wherein the first guide and the second guide section are disposed in a position which essentially does not change a direction of a run of cables from a direction upon entry to the first guide section to a direction upon exit from the second guide section.

9. The cable holder of claim 1, wherein the body includes a snap-lock element on the first cable path segment and a second snap lock element on the second cable path segment for snap-lock engagement when the cable holder is in the packaging position.

* * * * *